April 3, 1951 G. T. BAKER 2,547,804

TELEPHONE LINE INDENTIFICATION SYSTEM

Filed June 13, 1947 3 Sheets-Sheet 1

INVENTOR
GEORGE T. BAKER
By: Young, Emery & Thompson
Attys.

April 3, 1951 G. T. BAKER 2,547,804

TELEPHONE LINE INDENTIFICATION SYSTEM

Filed June 13, 1947 3 Sheets-Sheet 2

INVENTOR
GEORGE T. BAKER
By: Young, Emery & Thompson
Attys.

INVENTOR
GEORGE T. BAKER
By: Young, Emery & Thompson
Attys.

Patented Apr. 3, 1951

2,547,804

UNITED STATES PATENT OFFICE 2,547,804

TELEPHONE LINE IDENTIFICATION SYSTEM

George Thomas Baker, Liverpool, England, assignor to Automatic Telephone & Electric Company Limited, Liverpool, England, a British company Application June 13, 1947, Serial No. 754,561
In Great Britain July 25, 1946

8 Claims. (Cl. 179—27)

The present invention relates to electrical signalling systems, and is more particularly concerned with line identification in a telephone system, and the transmission of the identity to a central point for recording purposes.

In known methods of effecting line identification, identity signals have been impressed on a conductor in the line circuit other than a speech conductor. These identity signals have been extended by way of a similar conductor in a first numerical selector and thence by transformer coupling in an outgoing relay set to the speaking trunk extending to the recording centre. Such known line identification methods have necessitated certain modifications to the subscriber's line circuit and first numerical selector equipments, and while these may be acceptable for new telephone exchanges, they are an impediment to introduction of line identification on existing exchanges.

It is the object of the present invention to provide an improved method of calling line identification applicable to all types of telephone exchanges.

According to a feature of the invention, in an electrical signalling system having equipment individual to a station and equipment common to a plurality of stations, signals identifying the station are transmitted between said individual and common equipment using those conductors otherwise used for the transmission of intelligence.

According to a further feature of the invention, in an electrical signalling system, signals representing the identity of signalling points are transmitted from such points to a remote point entirely over conductors normally used for the transmission of other intelligence.

According to another feature of the invention, in a telephone system having facilities for indicating at a remote point the identity of calling lines, the identity signals are transmitted from the calling line circuits entirely over the speaking conductors.

According to a further feature of the invention, the transmission of the identity signals within the exchange at which the calling lines are located takes place over the speaking conductors.

According to yet another feature of the invention, a pair of non-linear resistance elements associated with each subscriber's line are connected to one of the speaking conductors in the subscriber's line circuit and to the appropriate ones of a plurality of common leads to which coded marking signals are applied, a common source of biasing voltage being provided such that the appropriate voltages are developed across the non-linear resistance elements when identification is or is not taking place to enable the transmission of the identity signals from the subscribers' line circuits to be effected entirely over the speaking leads without causing undue voltage changes on the speaking leads.

In order to prevent interference between lines which are being identified and lines not requiring identification, the individual signalling leads are connected in substantially equal numbers to the negative and positive speaking conductors. While such an arrangement is essential on lines upon which battery reversal is liable to occur, it may be possible to connect all the individual signalling leads to the positive or negative speaking conductor on lines where no battery reversal takes place.

According to a further feature of the invention a pair of non-linear resistance elements associated with each subscriber's line are connected to one of the speaking conductors in the subscriber's line circuit and to the appropriate ones of a plurality of common leads to which coded marking signals are applied, a potential being maintained across the non-linear resistance elements connected to lines not requiring identification of such a value that the resistance of the elements is sufficiently high to render negligible interference with said lines due to the transmission of identity signals.

According to a further feature of the invention, a pair of non-linear resistance elements associated with each subscriber's line are connected to one of the speaking conductors in the subscribers' line circuits and to the appropriate ones of a plurality of common leads to which coded marking signals are applied, lines requiring identification being impressed with a potential of such a value that the non-linear resistance elements connected to such lines is substantially reduced to enable the transmission of identity signals to take place.

From the point of view of identification, the line circuits may be considered as falling into three classes, (a) Idle circuits, (b) Circuits employed on conversational connections or the setting up of such connections, and (c) Circuits being identified.

In the case of (a) a number of circuits having their individual signalling leads connected to the negative speaking conductor will extend battery (for example via the negligibly low resistance line relay) over the individual signalling leads and the very high resistance non-linear resistance elements to the signalling common lead. The remainder having their individual signalling leads connected to the positive speaking conductor will extend earth over the signalling leads and the non-linear resistance elements to the common lead.

In the case of (*b*), low resistance battery and earth potentials by way of one or the other of the windings of the balanced relays associated with the speaking battery feeds, for instance in final selectors, or similar impulsing relays, are applied to the individual signalling leads and are extended over the non-linear resistance elements also to common leads.

Obviously, the bulk of subscribers' line circuits on an exchange will fall into classes (*a*) and (*b*), and it therefore follows that, in the case of individual signalling leads being connected in equal numbers to positive and negative conductors, the signalling common lead may be considered as the mid-point of a potentiometer arrangement and will be maintained very substantially at a steady potential equal to half that of the exchange battery supply, for instance if the battery supply were 50 volts and the positive plate of the battery were connected to earth, then the potential of the common lead would be 25 volts negative to earth.

It is essential that circuits employed on established connections, and the setting up of such connections, shall not suffer from interference from the identity signals being impressed on lines undergoing identification. To this end such circuits are virtually disconnected from the signalling common by maintaining the resistance of the non-linear resistors, in the signalling leads of such line circuits, at a very high value by virtue of the low potential difference across them. At the same time the non-linear resistors in the signalling leads of circuits undergoing identification are biased with a comparatively high potential difference to provide a low resistance path for signalling currents to the speech conductors.

Consider now, more particularly, the electrical conditions at the non-linear resistors associated with established connections and the like in a typical telephone system. The resistance of subscribers loop may range from zero to, in exceptional cases, values of the order of 1000 ohms, and the resistance of each winding of the balanced battery feed relays may be for instance 200 ohms. It therefore follows that the potential at the point where the non-linear resistors connect to the negative or positive speech conductor may range from 25 volts negative in the case of a zero loop to approximately 43 volts negative or 7 volts negative (depending on the conductor) in the case of a 100 ohm loop. Now the common side of the group of non-linear resistors is maintained at 25 volts negative, hence the potential difference across any resistor in an employed circuit does not exceed 18 volts, and in the majority of cases is considerably less. Now the characteristics of a suitable non-linear resistor are such that with a voltage of such a low order across it the resistance is of several hundreds of thousands of ohms and the individual signalling conductors are thus virtually disconnected from the common signalling lead.

The invention will be better understood from the following description of one method of carrying it out with reference to a four digit exchange, and should be read in conjunction with the accompanying drawings comprising Figs. 1, 2 and 3 which should be placed side by side with Fig. 1 on the left.

Figure 1:
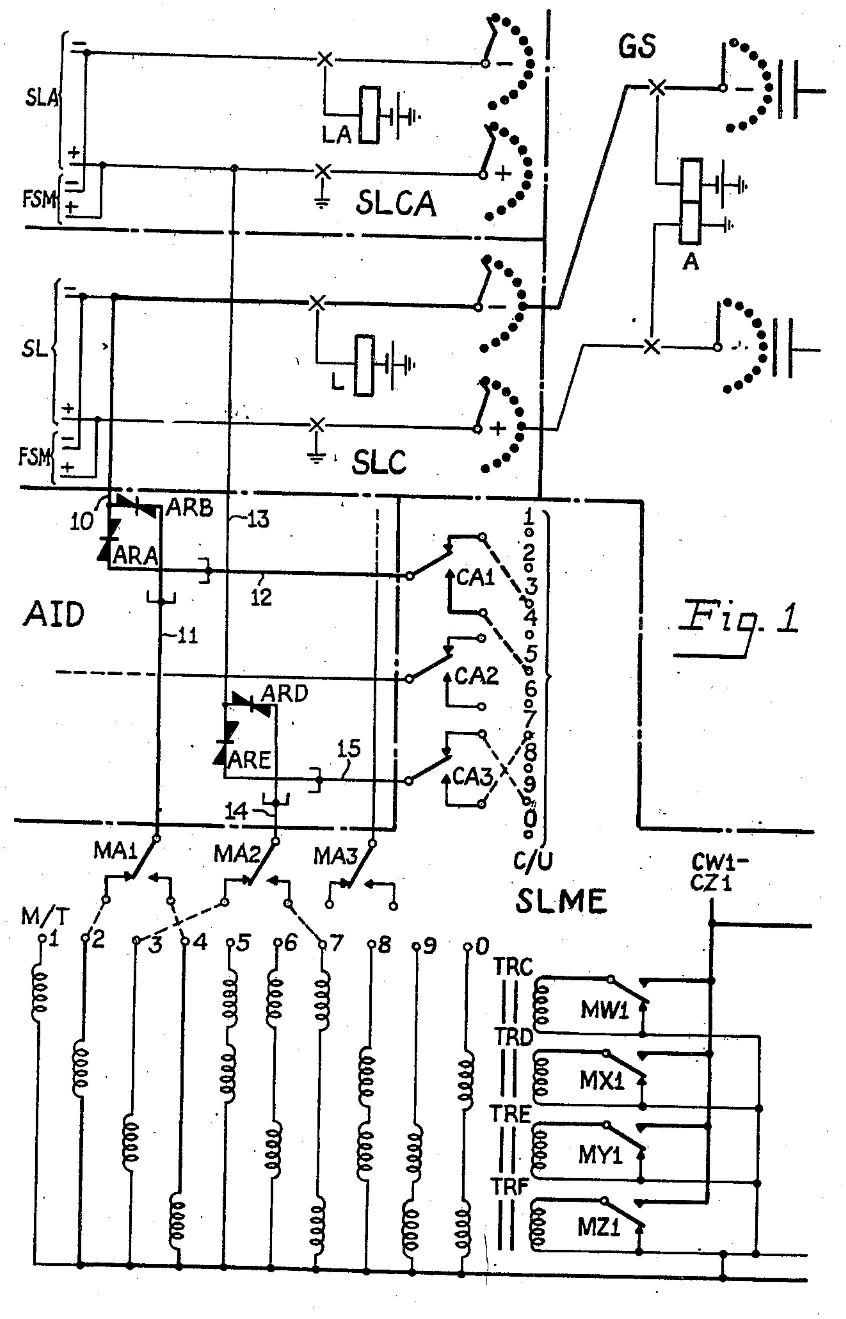
Fig. 1 shows skeleton versions of two subscribers' line circuits SLC and SLCA and a first numerical selector GS and the relevant element AID of the co-ordinate arrangement of non-linear resistor units.
Figure 2:
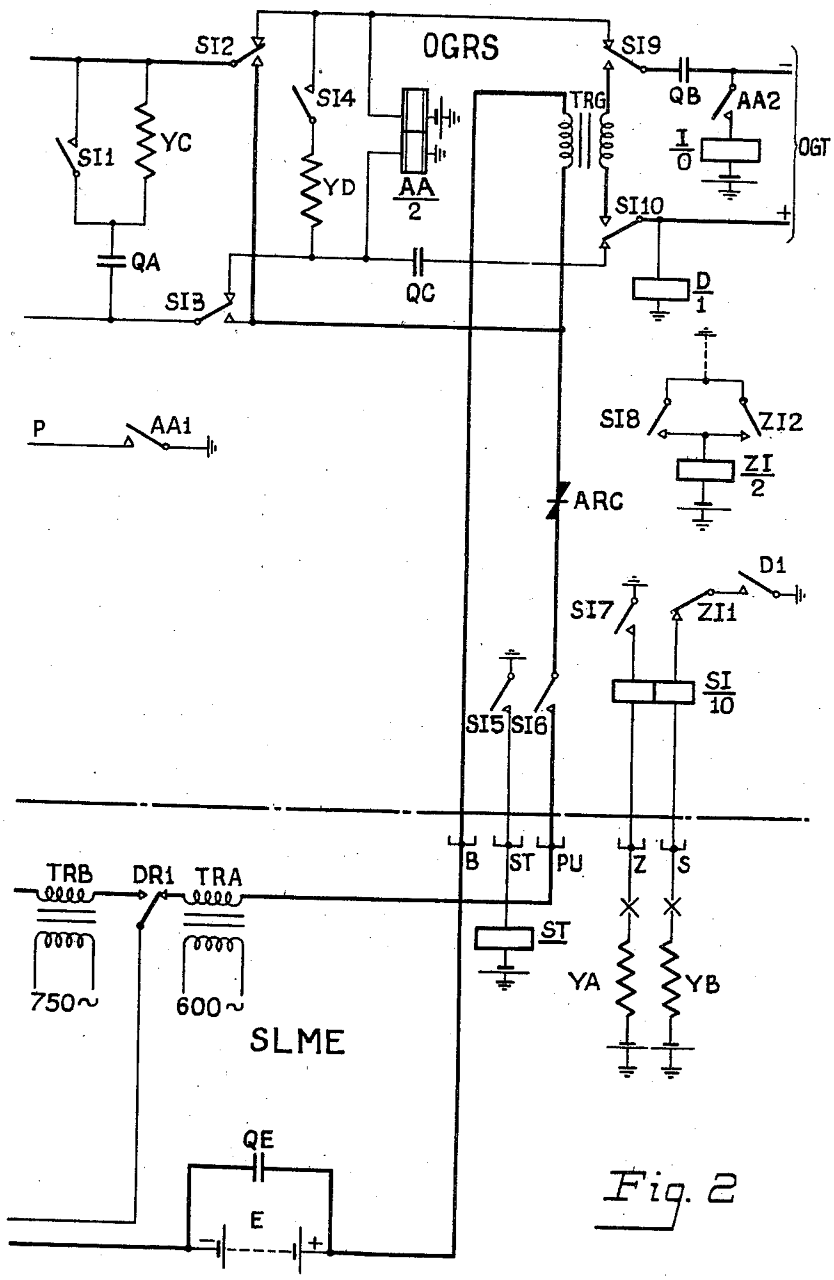
Fig. 2 shows an outgoing relay set OGRS which extends to the recording centre.
Figure 3:
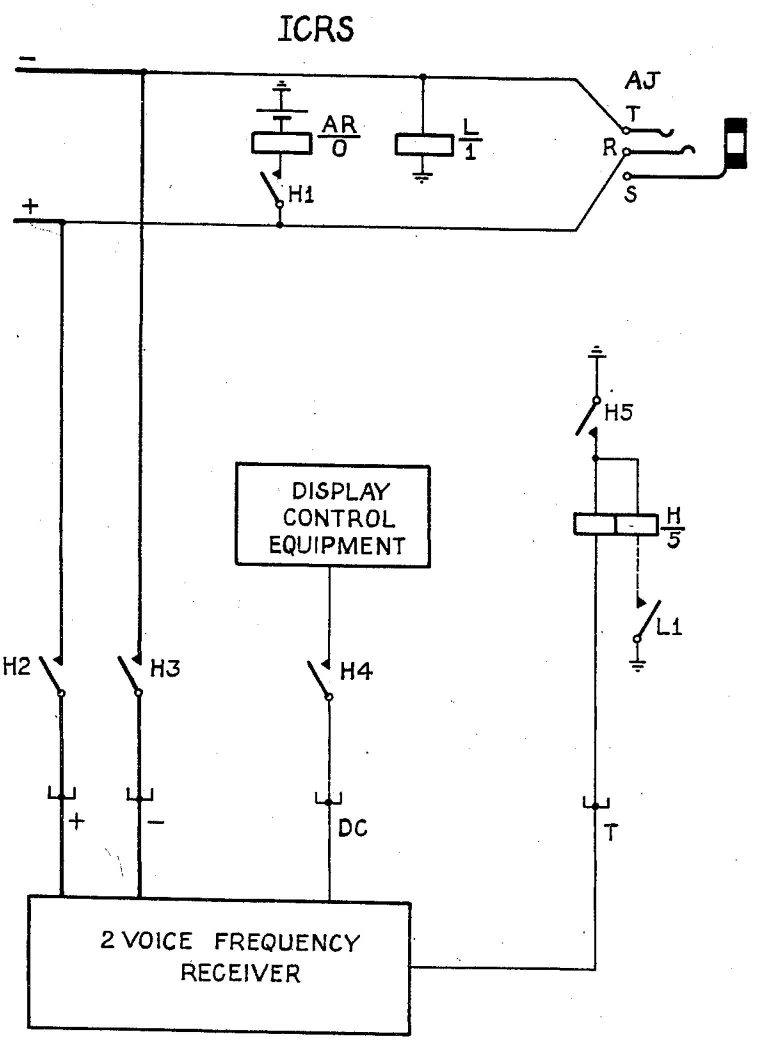
Fig. 3 shows diagrammatically an incoming relay set ICRS which terminates in a jack AJ and with which is associated display control equipment, the signal receiver being provided in common to a number of relay sets.

Figs. 1 and 2 together also show relevant elements of the subscriber's line identification equipment which is similar to that shown in detail in Figs. 4 and 5 of co-pending application No. 739,478, filed April 4, 1947.

A call requiring identification is set up in the orthodox manner, that is, when the calling party lifts his receiver the line relay L in the line circuit SLC operates over the loop, and the rotary line switch hunts for and seizes a free first numerical selector, whereupon relay L and the return earth on the positive lead are disconnected and the loop is extended to relay A in the selector. Relay A operates and responds to the first train of dialled impulses to cause the wipers to be raised to the level appropriate to the digit dialled, say to level 0. The wipers then advance into the bank and extend the speech conductors to a free outgoing relay set, whereupon relay A is disconnected and the calling loop is applied to relay AA. Relay AA operates and at contacts AA1 applies guarding earth to the P lead and at contacts AA2 extends battery via impedance coil I to the negative lead of the outgoing trunk OGT. This connection of battery to the negative lead causes the operation of relay L in the incoming relay set ICRS. As previously mentioned the relay set is shown diagrammatically, only those parts which are of interest as regards the present invention being shown. Consequently the arrangements for signalling the operator and the circuits of the operator's position have been omitted since these may be of any well known type. The signalling of the operator's position takes place on the operation of relay L and in addition relay L at contacts L1 prepares a circuit for relay H. This circuit is completed subsequent to the insertion of a plug in the jack AJ, and provided that the 2 V. F. receiver is idle. If the receiver is idle battery is connected to lead T in the receiver and relay H operates over both windings in series to earth at L1. Relay H in operating locks over its low resistance left-hand winding to guard the 2 V. F. receiver against seizure from another incoming relay set. Further relay H in operating at contacts H2, H3 and H4 connects the 2 V. F. receiver to the line and to the display control equipment. Finally at contact H1, relay H connects battery over impedance AR to the positive lead of the line to operate relay D in the outgoing relay set OGRS. Relay D operating completes a circuit for operating relay SI over the S lead to the subscriber's line marking equipment. Relay SI is held operated by contacts SI7 over the Z lead until completion of the marking cycle. The lightly adjusted contacts SI1 operate first and connect capacitor QA across the lines to prevent "clicks" in the receiver. Contacts SI2 and SI3 disconnect the original operating circuit for relay AA and divert the subscriber's negative and positive conductors to transformer TRG. Since the calling loop is disconnected from the speaking battery feed, subsequent voice frequency signals are inaudible to the calling party. Contacts SI4 provide a local holding circuit for relay AA in series with resistor YD. Contacts SI5 operate the start relay ST in the line marking equipment. Contacts SI6 close a point in the 600 C. P. S. spacing pulse lead PU. Contacts SI8 operate relay ZI. Contacts SI9 and SI10 connect the secondary of transformer TRG to the outgoing trunk. Relay ZI operating, at contacts ZI1 disconnects the original operating circuit for relay SI, and at contacts ZI2 provides a holding circuit for itself.

Meantime, relay ST in operating causes the marking cycle, as described in the co-pending application No. 739,478 to proceed, and the high speed relay DR consequently operates and releases at a predetermined rate. Now each time relay DR is normal a circuit is completed from the secondary of transformer TRA over contacts DR1, capacitor QE, B lead, primary of transformer TRG, non-linear resistor ARC, contacts SI6, PU lead and back to transformer TRA. The 600 C. P. S. signal is induced into this circuit and extended to the outgoing trunk OGT by way of transformer TRG. Thus the 600 C. P. S. spacing pulses are transmitted to the incoming relay set. Each time relay DR is operated a 750 C. P. S. signal is induced into the secondary of transformer TRB, whence it is applied in the well-known four unit code sequence to the primaries of transformers TRC—TRF associated with thousands and tens digits marking as determined by the marker relay contacts MW1—MZ1 or to a similar set of transformers associated with hundreds and units digits marking over marker relay contacts in the CW1—CZ1 lead. The thousands and tens transformers secondaries terminate on M/T 1—0, and the hundreds and units transformers secondaries terminate on C/U 1—0. The changeover relays MA and CA together with the distribution relays (not shown) in the subscriber's line marking equipment, determine that digit markings shall take place in the correct sequency, namely: thousands, hundreds, tens and units.

Consider now the marking of thousand digit 2. The changeover relay MA will be unoperated and at the appropriate time relays DR and MX are operated simultaneously. It will now be noted that the battery E, which has preferably an E. M. F. of 100 volts, is connected across the non-linear resistor ARB, the negative plate being extended over secondary of transformer TRD, M/T2, contacts MA1 and common lead 11 to resistor ARB, and the positive plate is extended over common lead B, transformer TRG primary, contacts SI2 and the negative lead of the selector GS and the line circuit SLC and over lead 10 to resistor ARB. As previously stated, the potential at common lead 11 is fixed substantially at 25 volts negative, and it therefore follows that the potential of the negative lead and lead 10 is substantially 75 volts positive to earth, consequently, while the potential difference across the non-linear resistor is 100 volts, the potential on the speech conductor is maintained within satisfactory limits. The value of the biased non-linear resistor ARB is consequently very considerably reduced to provide a path for voice frequency identity signals. Meantime, the voice frequency signal applied to the primary of transformer TRD, upon the operation of relays DR and MX, is induced into the secondary terminating on M/T2 and extended to the primary TRG over the circuit used for connecting the battery E to the non-linear resistor, the capacitor QE, however, across the battery provides a low impedance path to the voice frequency currents.

The identity pulses appropriate to the hundreds, tens and units digits are impressed on the subscriber's line and extended to the recording centre, in a similar manner to those of the thousand digit, where they may be transposed into relay operations to provide an audible or visual display of the calling subscriber's number.

With regard to the line circuit SLCA, the corresponding non-linear resistors ARD and ARE are connected to the positive lead in the line circuit. It has been assumed that the number of line SLCA is 3977 and the terminals of MA2 and CA3 to which common leads 14 and 15 are connected respectively are strapped to the terminals appropriate to this number. On the subscriber initiating a call, a group selector similar to GS is taken into use and is set on the desired level and then hunts over that level for an idle outgoing relay set and it will be assumed that the outgoing relay set OGRS shown in Fig. 2 is seized. The operation of setting up the connection over the incoming relay set ICRS and the operation of the subscriber's line marking equipment to cause the transmission of the identification signals is the same as described above with the exception that the signals pass to transformer TRG over contacts SI3 instead of SI2.

Upon completion of the identity cycle the Z lead in the subscriber's line marking equipment is opened to release relay SI which completes the speaking path and frees the subscriber's line marking equipment, contacts SI1 restore last to remove the short circuit from the high value resistor YC.

On exchanges which do not employ reversal of potentials on the speech conductors for metering or supervisory purposes all the individual signalling conductors in the line circuits may be connected to like speech conductors in the line circuits, for example, all might be connected to the negative conductors. In this case the potential at the common signalling lead would approach the full battery supply voltage of say 50 volts negative, thus the negative plate of the separate biasing battery assumes that potential, while the positive plate, assuming the biasing battery is 100 volts, extends a potential of 50 volts positive to the individual signalling lead. Thus, while the relevant non-linear resistor has 100 volts connected across it, to provide a low resistance signalling path, the potential on the speech conductor is kept at a normal level.

It will be appreciated that although specific reference has been made to non-linear resistors other devices may be used to fulfil the same function, for example, gas discharge tubes may be arranged to be substantially non-conducting at normal voltage and to have a much lower resistance to provide a signalling path when a suitable biasing potential is applied.

I claim:

1. In a telephone system, subscribers' lines, a plurality of common leads, means for applying coded marking signals to said common leads, at least one non-linear resistance element associated with each subscriber's line and connected on one side to one of the speech conductors of said subscriber's line and on the other side to at least one of said common leads in accordance with the numerical designation of said subscriber's line, common biasing means, and means responsive when one of said lines is to be identified for applying a bias derived from said biasing means to the non-linear resistance element associated with said line to permit the passage of the coded marking signals through said non-linear resistance element and over said speech conductor.

2. In a telephone system, subscribers' lines, a plurality of common leads, means for applying coded marking signals to said common leads, a pair of non-linear resistance elements associated with each subscriber's line and each connected on one side to said subscriber's line and on the other side to at least one of said common leads in accordance with the numerical designation of said subscriber's line, common biasing means, means responsive when such line is to be identified to apply a bias derived from said biasing means to the non-linear resistance elements associated with such line to permit the passage of the coded marking signals through said non-linear resistance element and over said line.

3. In a telephone system, subscribers' lines, a plurality of common leads, line marking equipment common to a plurality of said lines and including means for applying coded marking signals to said common leads, at least one non-linear resistance element associated with each subscriber's line and connected on one side to one of the speech conductors of said subscriber's line and on the other side to at least one of said common leads in accordance with the numerical designation of said subscriber's line, said line marking equipment also including biasing means and means responsive when a line is to be identified to apply a bias derived from said biasing means to the non-linear resistance element associated with said line to permit the passage of said coded marking signals through said non-linear resistance element and over said speech conductor.

4. A telephone system as claimed in claim 3 in which the connections from the non-linear resistors associated with approximately half the subscribers' lines are made to the negative speech conductor and the remainder are connected to the positive speech conductor.

5. A telephone system as claimed in claim 3 in which the connections from the non-linear resistors are made to the negative speech conductor.

6. In a telephone system, subscribers' lines, a plurality of common leads, means for applying coded marking signals to said common leads, at least one non-linear resistor associated with each subscriber's line and connected on one side to the said subscriber's line and on the other side to at least one of said common leads in accordance with the numerical designation of said subscriber's line, a voltage source, means operative to initiate the identification of a line and means responsive to the operation of said last mentioned means for connecting said voltage source across the non-linear resistor associated with said line for rendering said non-linear resistor conductive to said coded marking signals.

7. In a telephone system, subscribers' lines, a plurality of common leads, means for applying coded marking signals to said common leads, at least one non-linear resistor associated with each subscriber's line and connected on one side to a speech conductor of said subscriber's line and on the other side to at least one of said common leads in accordance with the numerical designation of said subscriber's line, means operative to initiate the identification of a line and means responsive to the operation of said last mentioned means for rendering said non-linear resistors conductive to said coded marking signals.

8. In a telephone system, subscribers' lines, a plurality of common leads, means for applying coded marking signals to said common leads, at least one static switching debice having a normally high impedance to said signals associated with each subscriber's line and connected on one side to a speech conductor included in said subscriber's line and on the other side to at least one of said common conductors according to the numerical designation of said subscriber's line, means operative to initiate the identification of a line and means responsive to the operation of said last mentioned means for reducing the impedance of the associated static switching device to enable marking signals indicative of said line to be transmitted through said static switching device and over said line.

GEORGE THOMAS BAKER.

REFERENCES CITED

The following references are of record in the file of this patent:

UNITED STATES PATENTS

| Number | Name | Date |
|---|---|---|
| 1,846,261 | Kittredge | Feb. 23, 1932 |
| 1,864,553 | Quass | June 28, 1932 |
| 2,077,537 | Taylor | Apr. 20, 1937 |
| 2,218,571 | Beale | Oct. 22, 1940 |
| 2,222,099 | Zapf | Nov. 19, 1940 |
| 2,252,766 | Holden | Aug. 19, 1941 |
| 2,270,246 | Bascom et al. | Jan. 20, 1942 |
| 2,286,445 | Taylor et al. | June 16, 1942 |
| 2,292,977 | Taylor | Aug. 11, 1942 |
| 2,338,242 | Haigh | Jan. 4, 1944 |
| 2,387,897 | Grandstaff | Oct. 30, 1945 |
| 2,424,585 | Simon | July 29, 1947 |
| 2,440,277 | Kruithof | Apr. 27, 1948 |
| 2,454,770 | Cabes | Nov. 30, 1948 |

FOREIGN PATENTS

| Number | Country | Date |
|---|---|---|
| 614,177 | Great Britain | Dec. 10, 1948 |